Feb. 11, 1930.  E. J. SWEETLAND ET AL  1,746,409
FILTER LEAF
Filed Dec. 6, 1926   2 Sheets-Sheet 1
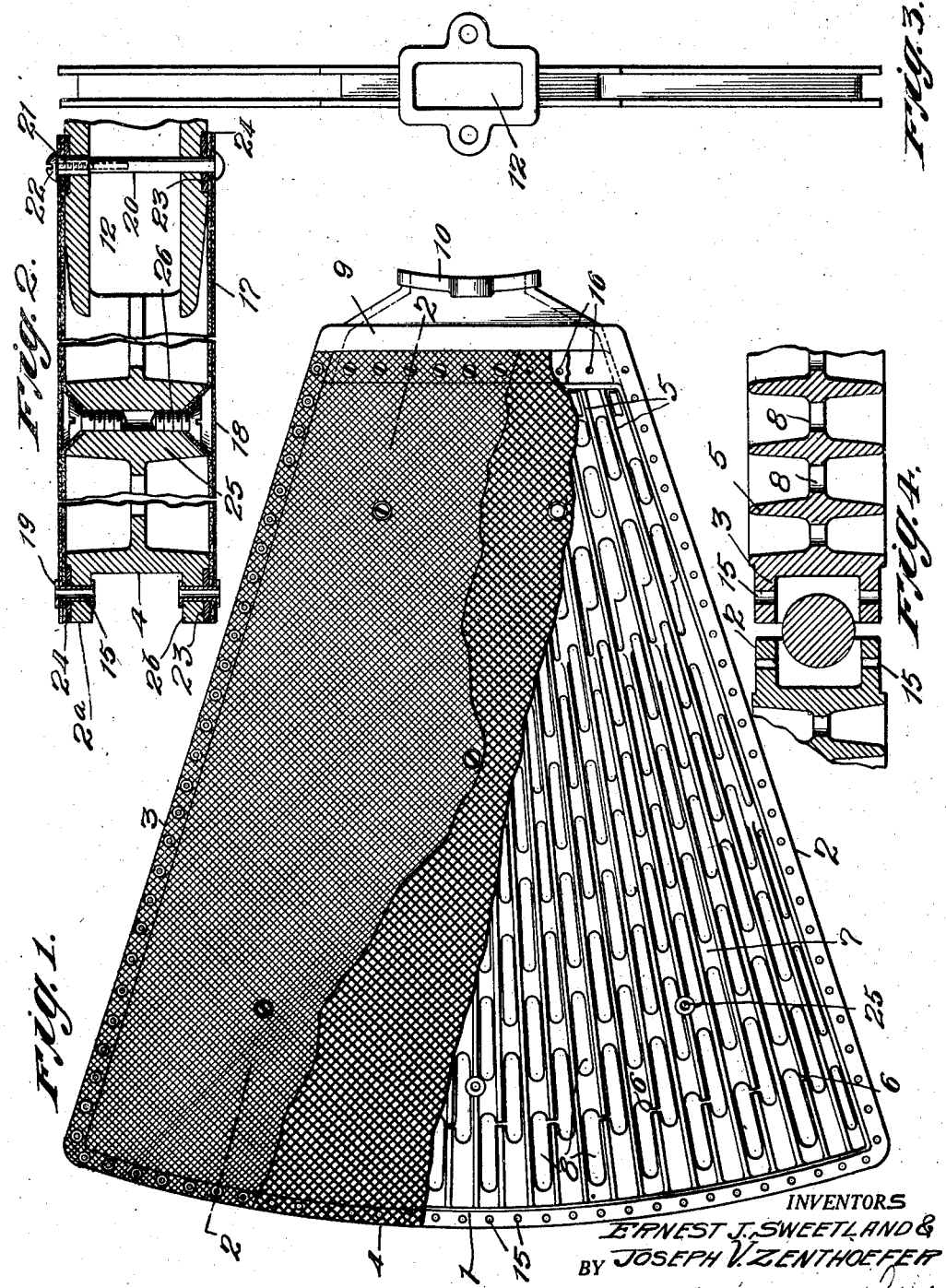
INVENTORS
ERNEST J. SWEETLAND &
BY JOSEPH V. ZENTHOEFER
ATTORNEYS

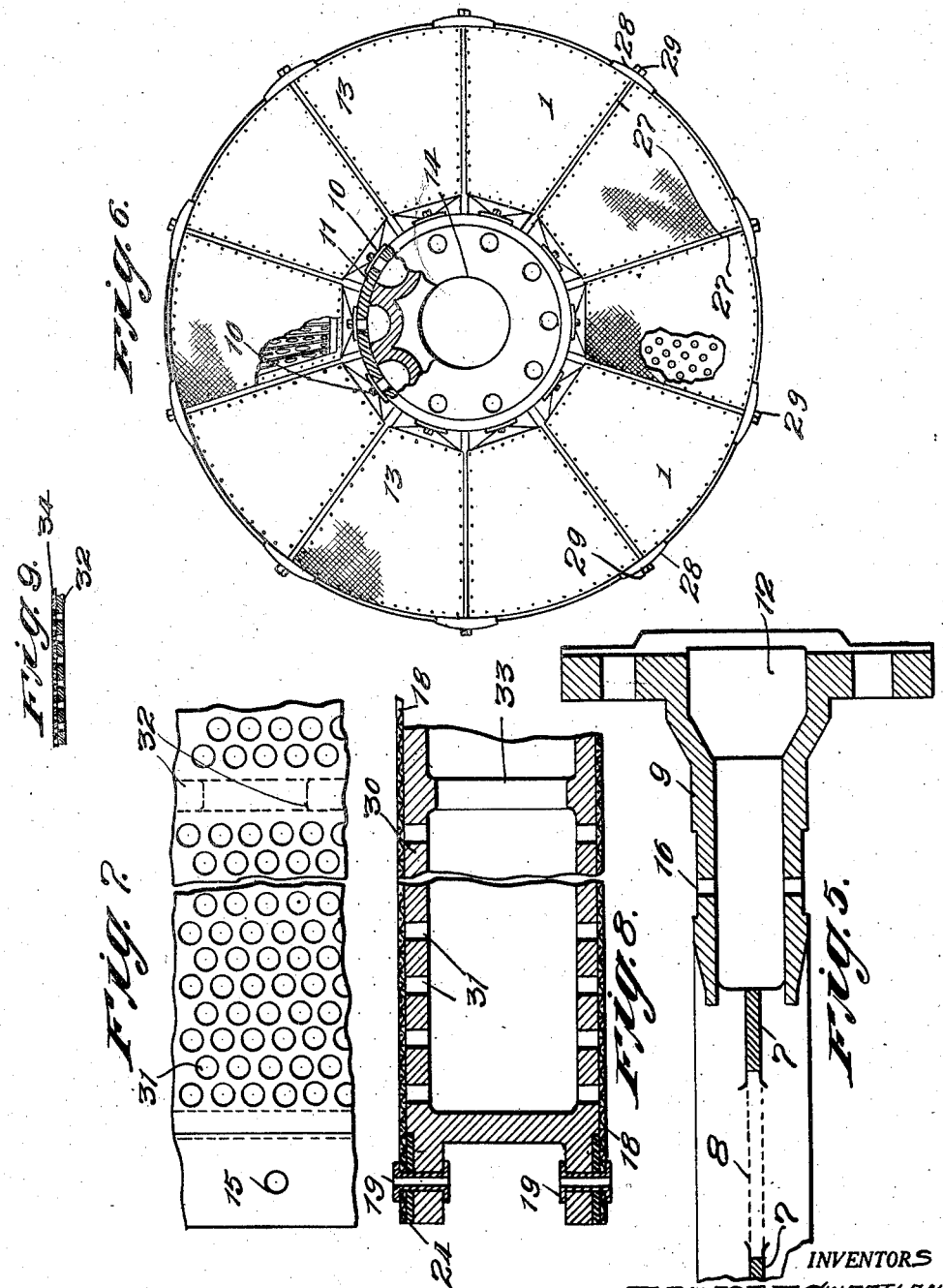

Patented Feb. 11, 1930

1,746,409

UNITED STATES PATENT OFFICE

ERNEST J. SWEETLAND AND JOSEPH V. ZENTHOEFER, OF HAZLETON, PENNSYLVANIA, ASSIGNORS, BY MESNE ASSIGNMENTS, TO OLIVER UNITED FILTERS INC., OF SAN FRANCISCO, CALIFORNIA, A CORPORATION OF NEVADA

FILTER LEAF

Application filed December 6, 1926. Serial No. 152,732.

This invention relates to an improvement in sectors and filter-leaf constructions for rotating leaf-type filters of either suction or pressure type.

The object of the invention is to provide a filter sector which will have greater drainage area, greater strength, lighter weight, and be cheaper to produce than those heretofore used.

Another object of the invention is to provide a one-piece cast filter sector which will be free from joints and other points of possible leakage or separation and which can be more quickly applied to or removed from the filter assembly, and to which the filtering medium may be more easily secured.

Another object of the invention is to provide a cast aluminum filter sector having all of the advantages above outlined having greater strength and less weight than previous sectors used on filters of this type, and being free from corrosion, warpage and other defects of previous filter sectors.

It will be understood that our filter sector may be used with slight modification from the drawings illustrated on any type of rotating leaf filter in order to more clearly illustrate the invention, however, we have selected the type of sector which is used on filters such as illustrated in the patent to O. J. Salisbury, No. 1,259,139, granted Mar. 12, 1918.

Referring to the drawings which illustrate various possible forms of the embodiment of our invention,—

Fig. 1 is a side view of the sector with the filtering medium and supporting medium partially broken away to show more clearly the construction of the sector.

Fig. 2 is a sectional view approximately on the line 2—2 of Fig. 1, with portions broken away to reduce the total length of the view.

Fig. 3 is an end view of the sector shown in Fig. 1 illustrating the outlet connection by which the sector is connected to the central shaft of the filter.

Fig. 4 is a detail sectional view through the abutting edges of two filter sectors showing how they are secured to the filter shaft.

Fig. 5 is a sectional view through the outlet nipple of the filter sector showing the path of the filtrate from the sector to the central drainage shaft.

Fig. 6 is a side view of a complete filter leaf partially broken away to show details of construction.

Figs. 7 and 8 are, respectively, a side and sectional view of the modified type of sector construction.

Fig. 9 is a view showing a still further modified form of sector construction and filter medium.

In the embodiment of the invention illustrated in Fig. 1, the sector comprises a sector-shaped casting 1 which is preferably cast of aluminum in one piece. The side edges 2 and 3 and the rear edge 4 of the sector are preferably of a channel construction, such as illustrated more clearly in Fig. 4, to provide greater strength and easy means for securing the filter medium to the sector, and a plurality of ribs 5 are provided, extending longitudinally of the sector, and cored or cut away portions 6, to permit proper drainage of the filtrate through the sector. The ribs 5 are spaced apart by webs 7 which are perforated at spaced intervals by elongated holes 8 extending through the webs from side to side of the sector providing a reduced weight and greater drainage area for the flow of the filtrate. At the reduced end of the sector, the side edges 2 and 3 and the longitudinal ribs 5 communicate and are integral with the cast outlet nozzle 9 which is provided with a suitable flanged coupling 10 adapted to rest against the central shaft 11 of the filter and communicate therewith through the cored hole 12 in the sector nozzle and the channels 13 in the filter shaft 14. Although not limited to use with metallic filtering mediums, such as woven wire cloth, perforated metal and the like, the filter sector is primarily designed for use with metallic filtering mediums, and, for this reason, the top and bottom walls of the channeled edges 2, 3 and 4 of the sector are provided with a row of perforations 15, and the rear edge of the nozzle 9 is provided with a row of perforations 16 by which the filtering mediums may be secured to the sector. The filtering medium in the embodiment, illustrated in Figs. 1 to 5, is preferably supported against collapsing or falling into the valleys between the ribs 5 due to the pressure on filter sector by means of a heavy mesh wire screen or the like 17, which supports the finer mesh wire filtering screen, perforated plate or other fine metallic mesh filtering medium 18.

Both said supporting and filtering layers are secured to the edges of the filter sector by means of hollow rivets or other quick clamping means 19 which pass through both layers of the filtering and supporting medium and through the perforations 15 in the channeled edges of the filter sector and are suitably clinched or clamped at both ends. It will be readily apparent that the construction of the channels 2, 3 and 4 and the spacing of the projecting edges 2ª and 2ᵇ thereof easily permit the use of an ordinary eyeletting or riveting pinchers in securing the filtering medium in place. At the inner edge of the sector, along the edges of the nozzle 9, the filtering and supporting mediums are secured by means of binding screws 20 passing through both walls of the nozzle 9 and through the hole 12 and having a perforated end 21 adapted to receive the headed screw 22 for drawing the two ends of the binding screw firmly together. In order to prevent leakage around the edges of the filtering medium, we find it preferable to provide depressions 23 around the edge of the filter sector and across the nozzle 9 and to provide suitable gaskets 24 resting in this depression between the edges of the supporting medium 17 and the sector. The gaskets 24 may be of any desired material. We have found, however, that heavy tar paper is very satisfactory for this purpose and is, at the same time, relatively inexpensive.

In order to keep the backing medium 17 taut and to prevent sagging thereof, a plurality of columns 25 are provided, extending from side to side of the filter sector at spaced intervals, and the backing medium 17 is drawn into these columns by means of headed screws 26, thus holding the backing layer against sagging under the pressure differential to which the filter medium is subjected.

It will be understood that the hollow rivets or other securing devices 19 are preferably of such a type that they can be secured and clamped in place by a hand riveting tool or other hand clinching tool, and are drawn sufficiently tight to compress the gaskets 24 and prevent leakage around the edges of the filtering medium. It will also be understood that this method of securing the filtering medium to the filter sector represents a decided advance over the prior practice of entirely enclosing the sector in a cloth bag which is sewed or otherwise closed along each edge, or the prior practice of drawing the metallic filtering medium over the edges of the filter sector and clamping the same in place. To remove the worn or damaged filter medium, the heads of the hollow rivets 19 may be quickly snipped or cut off and the filter medium removed.

As is shown more clearly in Fig. 5, the filtrate which is sucked through filtering medium by the partial vacuum maintained in the channels 13 of the central shaft flows along the webs 7 between the ribs 5 into the opening 12 in the outlet nozzle 9 and thence out of the filter through the channels 13.

Fig. 6 illustrates how a plurality of the sectors 1 are secured to the central rotating shaft 14 of a rotating leaf-type filter by means of a plurality of radially extending securing rods 27 connected to the central shaft at one end and provided with clamping members 28 and nuts 29 at the other end. As illustrated more particularly in Fig. 4, the radial rods 27 are received between the side channeled edges 2 and 3 of the filter sectors 1, and the clamping members 28 are received in the channeled edges 4 at the outer end of the filter sectors 1. When secured to the central shaft in this manner, the filter sectors have relatively slight chance of working loose or becoming separated in service in any manner as the overhanging edge of the channels striking the rods 27 prevent sidewise movement of the sector. The outlet flanges 10 of the sectors are firmly forced against the surface of the central shaft so that by means of a suitable gasket inserted between the edge 10 and the surface of the shaft, a leaf-proof joint is readily formed. It will be understood that in the use of a filter sector of this type, suction is communicated to the inside of the filter sector through the channels 13 in the central shaft, and the filtrate is drawn into the sector, depositing the sludge or filter cake on the surfaces thereof, the filtrate escaping through a suitable valve at the end of the channels 13 of the central shaft. When used in a pressure filter, the filter leaves rotate in an enclosed chamber, in which the sludge is placed under a higher pressure than that of the atmosphere, and the filtrate is forced through the filtering medium by the differential in pressure.

In the modification illustrated in Figs. 7 and 8, the sides of the cast aluminum filter sector are formed integrally of perforated cast plates 30 over which the filtering medium 18 may be directly secured, the perforations 31 forming suitable drainage space and the perforated side walls 30 giving sufficient support to prevent sagging of the filtering medium under the pressure differential and eliminating the use of the supporting medium 17 illustrated in Figures 1 to 5. It will be understood that the perforations in the side walls 30 may be formed either by suitable cores in the original casting operation or by casting the walls solid and drilling, the former method being preferable. In this embodiment of the invention, lateral ribs 22 extend from the side edge 2 to the side edges 3 of the filter sector and are provided with perforations 33 at spaced intervals to permit longitudinal drainage of the filtrate toward the nozzle 9. The filtering medium used with the filter of this type may be of any desired material, such as metallic filter cloth, the fine mesh screen, smooth rolled fine mesh screen, or smooth perforated plate. In Fig. 9 the cast wall 32 of the filter sector is shown as supporting a perforated plate 34 having a number of very fine perforations suitably meshed to carry out filtration of the desired sludge.

What we claim is:

1. As an article of manufacture, a one piece cast filter sector having channeled side and end edges, and an integral outlet nozzle.

2. As an article of manufacture, a one piece cast filter sector having channeled side and end edges, drainage spaces in the mid section, and an integral outlet nozzle, means on the overhanging edges of said channels for securing a filtering medium on said sector, and means on said outlet nozzle for securing the filtering medium.

3. As an article of manufacture, a one piece cast filter sector having channeled side and end edges, drainage spaces in the mid section, and an integral outlet nozzle, means on the overhanging edges of said channels for securing a filtering medium on said sector, means on said outlet nozzle for securing the filtering medium, and integral means to support the filtering medium against sagging into the drainage spaces.

4. As an article of manufacture, a one piece cast filter sector having channeled side and end edges, and an integral outlet nozzle, perforations in the overhanging portions of said channeled edges, and a filtering medium secured to the edges of said sector by metallic fasteners passing through said perforations.

5. An all metal filter sector for rotating leaf filters, comprising a one piece cast sector frame, provided with drainage spaces and an integral outlet nozzle, means to support a filter medium on said sector, and a metallic filter medium supported on said sector and secured thereto along the edges of the sector.

6. A one piece filter sector for rotating leaf filters, comprising a sector shaped channeled frame, an integral outlet nozzle at one end of said frame, a drainage space in said channeled frame, means to support the filter medium from sagging into said drainage space, and a metallic filtering medium secured to the edges of said channeled frame.

7. In a rotating filter leaf, a central drainage shaft and a plurality of separable filter sectors, comprising sector shaped channeled frames, drainage spaces surrounded by said frames, and an integral outlet nozzle from said frames, a filter medium supported on each side of said sector shaped frames and secured to the projecting edges of said channeled frame, radial tie rods secured to said central shaft and extending between the projecting edges of adjacent channeled sector frames, and means on said rods to secure the filter sectors to said central shaft.

8. A filter element for filters of the disc type which comprises a sector-shaped member provided with suitable drainage channels, a pair of projecting flanges extending along the radii of the sector means to secure the filter medium to said flanges, and means extending through the channel formed by said flanges for securing the sector shaped members to a central shaft.

9. A filter sector for use in filters of the disc type which comprises a drainage member having perforated extended flanges along the radii and circumference of the sector, and metallic fasteners to secure filter plates of perforated metal in said perforations.

10. As an article of manufacture, a one piece, cast metal filter sector having channeled side edges and an integral outlet nozzle.

11. As an article of manufacture, a one piece, cast filter sector having channeled sides, drainage spaces in the mid section, and an integral outlet nozzle, means on the edges of said channels for securing a filter medium on said sector and means on said outlet nozzle for securing the filtering medium.

12. As an article of manufacture, a one piece, cast metal filter sector having channeled side edges, drainage spaces in the mid section, and an integral outlet nozzle, means on the overhanging edges of said channels for securing a filtering medium on said sector, means on said outlet nozzle for securing the filtering medium and integral means to support the filtering medium against sagging into the drainage spaces.

13. As an article of manufacture, a cast metal filter sector, drainage spaces in the mid section, and an integral outlet nozzle, means on the edges of said sector for securing a filtering medium thereto, means on said outlet nozzle for securing the filter medium, and integral means to support the filtering medium against sagging into the drainage spaces.

14. As an article of manufacture, a one piece, cast filter sector having an integral outlet nozzle, perforations in the overhanging portions of the edges of said sector and a filtering medium secured to the edges of said sector by metal fasteners passing through said perforations.

15. In a disc filter of the class described having a plurality of filter discs, each filter disc having a plurality of all metal filter sectors, each sector comprising a one piece cast aluminum sector frame, provided with drainage spaces, an integral outlet nozzle communicating with said drainage spaces, means to support a filter medium on said sector, a metallic filter medium on said sector and secured thereto along the edges of the sector, and means to secure said sectors to the filter.

16. A filter element for filters of the disc type which comprises a one piece aluminum sector shaped member provided with suitable drainage channels, a pair of projecting flanges extending along the radii of the sector, means to secure the filter medium to said flanges, means to support the filter medium from sagging in said channels and means extending through the channel formed by the radial flanges for securing the sector shaped flanges to a central shaft.

17. A filter sector for use in filters of the disc type which comprises a cast metal drainage member having perforated extending flanges along the radii of the sector and metal fasteners to secure filter plates of perforated metal in said perforations.

18. A filter disc for a rotating leaf filter having a central drainage shaft which comprises a plurality of individual one piece, cast aluminum filter sectors and means for securing said sectors to said shaft, said sectors each being provided with an integral outlet nozzle.

In testimony whereof we have affixed our signatures to this specification.

ERNEST J. SWEETLAND.
JOSEPH V. ZENTHOEFER.